Sept. 11, 1956 T. A. ST. CLAIR 2,762,602
QUICK SHUT-OFF VALVE
Filed March 18, 1953

INVENTOR.
THEODORE A. ST. CLAIR
BY
RICHEY, WATTS, EDGERTON & McNENNY
A.D.Watts
ATTORNEYS

United States Patent Office 2,762,602
Patented Sept. 11, 1956

2,762,602
QUICK SHUT-OFF VALVE

Theodore A. St. Clair, South Euclid, Ohio, assignor to The Weatherhead Company, Cleveland, Ohio, a corporation of Ohio Application March 18, 1953, Serial No. 343,051

1 Claim. (Cl. 251—301)

This invention relates generally to shut-off valves and more particularly to a fast acting shut-off valve of the ball type.

In the past difficulty has been encountered in providing a durable fast acting valve structure which is relatively immune to wear and which requires little or no maintenance through the normal service life. In general ball type valves provide a relatively hard spherical or ball type sealing member which seats or fits against a valve seat under the force of a spring. Because the ball is formed of a relatively rigid hard material it is necessary that the tolerances between the ball and the valve seat must be accurately controlled. In such structures leakage often occurs due to the wearing of the valve seat as the ball is seated and unseated during normal operation. Because of these poor wearing properties this type of valve has received only a limited amount of use even though it has the advantage of fast operation and requires a relatively small amount of effort to operate.

It is an important object of this invention to provide a valve employing a spherical sealing member which is relatively immune to wear and which will provide a long trouble free service life.

It is another important object of this invention to provide a ball type valve wherein the sealing member is slightly resilient so that imperfections in the valve seat will not prevent a proper seal between the sealing member and the valve seat.

It is still another object of this invention to provide a ball type valve wherein the sealing force of the sealing member against the valve seat is proportional to the pressure of the fluid being sealed and wherein no mechanical means are necessary to urge the sealing member against the valve seat.

The foregoing and other objects and advantages will become apparent in view of the following description taken in conjunction with the drawings, wherein.

In a preferred embodiment of this invention the valve is comprised of a body formed with a first bore having a substantially large diameter and a second bore coaxial with the first bore. Fluid communication is provided between the first and second bores by an offset bore. An inlet for connection to a fluid pressure source provides fluid communication into the large first bore and a plurality of outlets provide fluid communication with the second bore. A sealing member having a spherical shape and preferably formed of nylon is positioned within the first bore and has a diameter larger than the offset bore. Movable means are provided to move the sealing member into and out of engagement with the opening of the offset bore in the first bore. When the sealing member approaches the opening of these two bores the fluid pressure within the first bore urges the sealing member into engagement with the valve seat formed by the intersection of the first bore and the offset bore.

Figure 1:
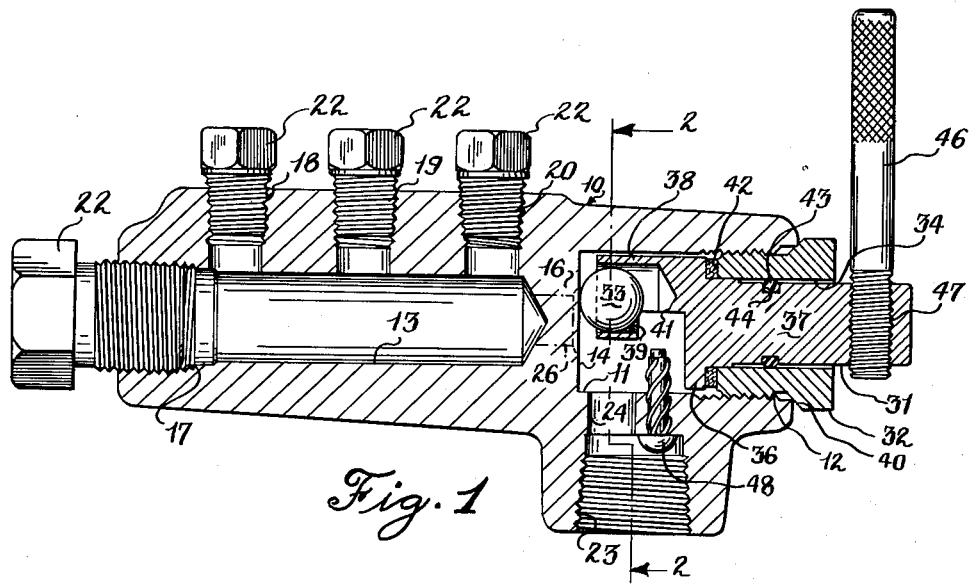
Fig. 1 is a cross sectional view of a preferred embodiment of the assembled valve.
Figure 2:
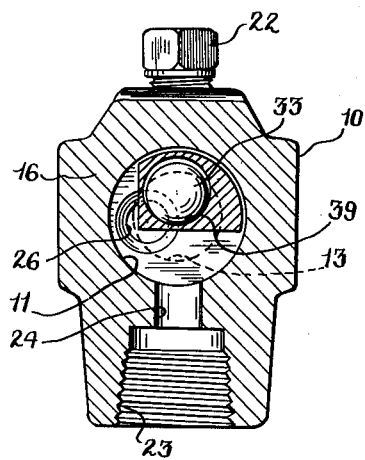
Fig. 2 is a view taken along 2—2 of Fig. 1.

Referring to the drawings, the body 10 is formed with a first bore 11 which is threaded toward the outer end with the threads 12. A second bore 13 extends from the opposite end of the body and is coaxial with the first bore 11. The second bore 13 terminates at a position spaced from the bottom 14 of the first bore 11 leaving a wall 16 between the two bores. As shown in Fig. 1 the bottom 14 of the first bore 11 is preferably radial providing a surface perpendicular to the axis of the bore. The body 10 is also provided with a plurality of threaded openings 17 through 20 which are adapted to be connected to conduits leading to the equipment being supplied by the valve. These outlets, of course, are all in fluid communication with the second bore 13. Plugs 22 may be threaded into the outlets 17 through 20 if any particular outlet is not necessary for the installation and suitable tube or pipe connecting means may be substituted for these plugs when the outlet is to be connected to another apparatus.

An inlet 23 is provided for connection to a source of fluid under pressure and provides fluid communication through the passage 24 into the first bore 11. Suitable thread means are provided on the inlet 23 to provide for attaching appropriate fittings. An offset bore 26 extends through the wall 16 and provides fluid communication between the first bore 11 and the second bore 13. In the preferred embodiment the axis of the offset bore is parallel to and spaced from the axis of the bores 11 and 13 and the diameter of the bore 26 is substantially less than the diameter of the first bore 11.

To provide for isolating the first bore 11 from the second bore 13 a valve closure mechanism is utilized which is comprised of a stem 31, a bonnet 32 and a sealing member 33. The bonnet 32 is provided with threads adapted to engage the threads 12 in the first bore 11 until the shoulder 40 engages the end of the first bore 11 providing a fluid seal therebetween. The bonnet 32 is also formed with a bore 34 which is coaxial with the first bore 11 when the bonnet is threaded into the end of the first bore. The stem is provided with an enlarged section 36 having a diameter slightly less than the diameter of the first bore 11 and a shaft portion 37 having a diameter adapted to fit through the bore 34 in the bonnet 32. An offset projection 38 extends from the enlarged section 36 and is bored as at 39. The bore 39 has an axis preferably parallel to the axis of the shaft portion 37 and spaced therefrom a distance equal to the spacing of the axis of the offset bore 26 from the axes of the first bore 11. The diameter of the bore 39 is substantially larger than the diameter of the offset bore and is slightly larger than the diameter of the sealing member 33. The proportioning of the bore 39 and the sealing member 33 is such that the sealing member 33 is retained within the bore 39 by the bottom 14 of the first bore 11. The offset projection 38 is cut away as at 41 to insure that the inner end of the bore 39 is open. The sealing member 33 is preferably substantially formed of Nylon and has a spherical diameter substantially larger than the diameter of the offset bore 23 and is adapted to engage the opening of the offset bore 26 and isolate the first bore 11 from the second bore 13. A thrust washer 42 is positioned between the enlarged section 36 and the end face of the bonnet 32 and acts as a thrust bearing between these two members. The washer 42 is preferably formed of Nylon material. A suitable O-ring type seal 43 is positioned in the groove 44 in the shaft portion 37 and provides a fluid seal between the shaft portion 37 and the bonnet 32. A suitable handle 46 may be threaded into the cross bore 47 in the portion of the shaft 37 which extends beyond the end of the bonnet 32 and provides a means for rotating the stem 31. A drive screw 48 extends into the first bore 11 and is adapted to engage the side wall of the cut away portion 41 and limit the amount of rotation of the stem 37.

Figure 3:
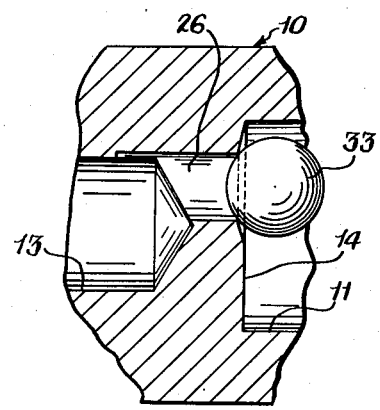
Fig. 3 is a cross section with parts removed for purposes of clarity showing the valve in the closed position with the sealing member in engagement with the valve seat.

In operation a fluid pressure source is connected to the inlet 23 and at least one of the outlet passages 17 through 20 is connected to the apparatus to be supplied. When the valve is open and in the position shown in Fig. 1 the fluid under pressure flows into the first bore 11 through the passage 24 and on into the second bore 13 through the offset bore 26. From the second bore 13 the fluid then passes on to the equipment being supplied with the fluid under pressure. When the stem 31 is rotated by the handle 46 to the position shown in Fig. 3 the sealing member 33 is positioned above the offset bore 26 by the bore 39. At this time the fluid flowing through the offset bore 26 will urge the sealing member 33 into engagement with the opening of the offset bore 26 thereby isolating the first bore 11 from the second bore 13. No springs are necessary to urge the sealing member 33 into engagement with the opening of the offset bore 26 since the fluid flow itself will initiate the seating. This is possible since Nylon is a relatively light material which can be moved by an even relatively small amount of fluid flow where in the past, steel balls were used which had to be urged into engagement with the bore by the use of springs. As the fluid pressure increases the force of the sealing member 33 against the opening of the offset bore 26 increases and therefore leaks of any kind are prevented. Also, since Nylon is slightly elastic, a good seal is provided even though the opening of the bore 26 may not be perfectly formed. When the stem 31 is rotated by the handle 46 to open the valve the side walls of the bore 39 engage the sealing member 33 and move the sealing member away from the offset bore 26 thereby re-establishing a fluid communication between the first bore 11 and the second bore 13. In this unseating of the sealing member 33 from the offset bore 26 the use of Nylon is very important since the Nylon does not result in a wearing of the opening between the offset bore 26 and the first bore 11 which would cause leakage.

It is understood that although Nylon is specified as the preferred material for forming the sealing member 33 other materials which are slightly elastic, light in weight and which have durable properties similar to the Nylon may be substituted therefor.

A valve according to this invention requires very little force to open the valve since the radial force supplied by the bore 39 merely has to roll the sealing member 33 away from the offset bore 26.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

A valve body having an inlet and an outlet, a cylindrical inlet chamber in one end of said body, a cylindrical outlet chamber in the other end of said body, said chambers being co-axially disposed and separated from each other by a wall, said wall having a cylindrical port formed therein to establish fluid communication between said chambers, said inlet being at right angle to said outlet, the axis of said cylindrical port being parallel to and eccentric of the axis of said chambers, a plug in said inlet chamber mounted for rotation about the axis of said chambers, said plug having a cylindrical bore in the end face thereof adjacent said wall, the axis of said bore being parallel to the chamber axis and having the same eccentricity with respect to the chamber axis as the axis of the cylindrical port, a resilient ball in said port having a diameter less than the bore diameter and greater than the port diameter for seating in said port to regulate flow through said cylindrical chamber, said body having an inlet for said inlet chamber adjacent said wall, means carried by the body to prevent axial movement of said plug away from said wall, the end of said plug adjacent the wall being recessed at one side of its axis for a portion extending past said inlet on that side thereof adjacent said inlet whereby rotation of the plug on its axis moves the ball in and out of alignment with said port without restricting the flow from said inlet into said inlet chamber.

References Cited in the file of this patent
UNITED STATES PATENTS

| | | |
|---|---|---|
| 1,725,280 | Kiefer | Aug. 20, 1929 |
| 2,196,503 | McFee | Apr. 9, 1940 |
| 2,209,136 | Parker | July 23, 1940 |
| 2,257,642 | Orzehowsky | Sept. 30, 1941 |
| 2,524,952 | Ashton | Oct. 10, 1950 |
| 2,531,679 | Glos | Nov. 28, 1950 |
| 2,646,246 | Tucci | July 21, 1953 |

FOREIGN PATENTS

| | | |
|---|---|---|
| 1,977 | Great Britain | May 6, 1912 |